United States Patent Office 3,374,281
Patented Mar. 19, 1968

3,374,281
PRODUCTION OF ALKYLATED BENZENES
FROM PARAFFINS
Sigmund M. Csicsery, Greenbrae, Calif., assignor to Chevron Research Company, San Francisco, Calif., a corporation of Delaware
No Drawing. Filed Sept. 28, 1965, Ser. No. 491,023
8 Claims. (Cl. 260—673)

ABSTRACT OF THE DISCLOSURE

A process for the production of alkylated benzene compounds in which a feed stream comprising at least one $C_4$-$C_5$ paraffin and hydrogen (in a hydrogen-to-hydrocarbon ratio of less than 1.0) is contacted with a catalyst comprising a Group V, VI or VII metal or oxide dehydrogenating component and an acidic component of specified acidity at a temperature of 800°–1200° F. and a pressure of 2–500 p.s.i.a., yielding alkylated benzene compounds as the principal aromatic reaction products. Acidity is measured by the mol ratio of isobutene to normal butenes in the product. Temperatures of 950°–1170° F. and pressures of 5–100 p.s.i.a. are preferred.

---

This invention relates to the conversion of low molecular weight paraffinic hydrocarbons and, more particularly, to the direct conversion of said low molecular weight paraffinic hydrocarbons into higher molecular weight alkylated benzene compounds.

In the course of a typical petroleum processing operation in a refinery, a number of low molecular weight paraffinic hydrocarbons, among them the butanes and pentanes, are formed, often in large quantities. Since these materials are of relatively low value, it would be desirable to convert them into more valuable products. One such group of more valuable products is the alkylated benzenes: toluene, ethylbenzene, the xylenes, etc. Heretofore, however, no process has existed for the direct conversion of the $C_4$ and $C_5$ paraffins to alkylated benzenes. It is, therefore, the purpose of this invention to provide a novel one-step process in which a paraffinic hydrocarbon feed comprising $C_4$ and $C_5$ paraffins can be converted directly to a product which consists of substantial amounts of aromatic compounds, with the major portion of said aromatic product being the alkylated benzene compounds.

In the process of the present invention, a feed stream comprising at least one $C_4$ or $C_5$ paraffin is contacted in a reactor with no more than a limited amount of added hydrogen and with a catalyst consisting of a dehydrogenation component selected from the group consisting of Groups V, VI and VII metals and their oxides disposed on a solid, acidic support at a temperature of 800° to 1200° F. and a pressure of 2 to 500 p.s.i.a. The acidity of the support must be such that the acidity index (to be defined below) of the entire catalyst is between 0.10 and 0.79. It is apparent that the present process of converting, for example, isobutane to a $C_8$ alkylated benzene, is quite different from processes in which naphthas or other higher molecular weight paraffins are dehydrocyclized (i.e., conventionally "reformed"). The process of this invention has consequently been named "dehydrocyclodimerization" to differentiate it from other processes.

The catalysts used in this process contain two components: a dehydrogenation component and an acidic component. The dehydrogenation component is selected from the group consisting of the Group V, VI and VII metals and their oxides. It is contemplated that mixtures of the metals and their oxides, to the extent that the oxides are stable at the reaction conditions, can be used. Preferred are the Group V metal oxides, particularly vanadia. In one instance chromia will be preferred. Others which can be used are manganese, tungsten, molybdenum, manganese oxide, tungsten oxide, molybdena, and rhenium. The total amount of the dehydrogenation component should be in excess of 0.5 weight percent (as the metal) and may be up to 40 weight percent. The preferred range is 3 to 35 weight percent. The acidic support may be alumina, magnesia, silica-alumina, silica-magnesia, or any of these materials treated with acidic materials, such as chloride and fluoride. Additionally, acidity of the catalyst can be attained by employing a support comprising both silica and alumina with additional compounds such as zirconia. Acid-activated clays and synthetic metal aluminum silicates (including synthetic chabazites normally referred to as "molecular sieves") can also be employed as the catalyst support.

To counter the neutralizing effect of any minute amounts of other materials that may be present on the support, it is required that the catalyst have at least an acidity index of 0.10. The acidity index is determined in the following manner. A sample of catalyst is placed in a reactor at 1040° F. and normal butane at atmospheric pressure and a liquid hourly space velocity (LHSV) of 1 volume of feed per volume of catalyst is contacted with it. The butenes in the product are measured, and the mol ratio of the isobutene to normal butenes is measured; this value is defined to be the acidity index. The more acidic the catalyst, the higher its activity index will be, and in general the greater the conversion of feed to alkylated aromatics will be. Consequently it is preferred to use catalysts which have acidity indices above 0.40. The maximum acidity index as thus defined will be approximately 0.79, which is the equilibrium ratio of isobutene to normal butenes in the butane conversion reaction, based on the data of F. D. Rossini et al., "Selected Values of Physical and Thermodynamic Properties of Hydrocarbons and Related Compounds, American Petroleum Institute Research Project 44," Carnegie Press, Pittsburgh, Pa. (1953). All of the catalysts discussed in this specification have acidity indices within the preferred range. Table I presents the acidity indices for several of the representative catalysts which subsequently appear in this specification.

TABLE I

| Run No. | Catalyst | Acidity Index |
|---|---|---|
| 2 | Chromia-Alumina (21% Cr) | 0.70 |
| 5 | Chromia-Alumina (4% Cr) | 0.45 |
| 6 | Chromia-Silica-Alumina | 0.55 |
| 7 | Vanadia-Alumina | 0.54 |
| 8 | Tungsten Oxide-Alumina | 0.65 |

A number of experimental runs were made in which butane feed was contacted with various catalysts. The per-pass conversion to aromatics for each run was substantial, as was the ultimate yield of aromatics, i.e., the total amount of aromatics produced when all $C_3$ to $C_5$ paraffins are recycled to extinction. Representative results are shown in Table II.

TABLE II

| | Run Number | | | |
|---|---|---|---|---|
| | 1 | 2 | 3 | 4 |
| Catalyst | Vanadia-Fluorided Alumina | Chromia-Alumina | Chromia-Silica-Alumina | Manganese Oxide-Alumina |
| Metal Content, Wt. percent | 4 | 21 | 16 | 4 |
| Feed | Normal Butane | Normal Butane | Isobutane | Normal Butane |
| Temperature, °F | 1,100 | 1,100 | 1,040 | 1,160 |
| Pressure, Atm | 1 | 1 | 1 | 1 |
| LHSV | 0.48 | 0.63 | 0.5 | 0.95 |
| Per-Pass Conversion to Aromatics, Wt. percent | 31 | 30 | 11 | 21 |
| Ultimate Yield of Aromatics, Wt. percent | 39 | 42 | 40 | 32 |

The aromatic product of each experimental run consisted of at least 70 weight percent of alkylated benzene compounds. The aromatic product distributions for several representative runs are shown in Table III.

The process of this invention is conducted at temperatures of from about 800° to 1200° F., and preferably from about 950° to 1170° F. Above these temperatures, but otherwise following the conditions of the present

TABLE III

| | Run Number | | | | | |
|---|---|---|---|---|---|---|
| | 5 | 6 | 7 | 8 | 9 | 10 |
| Catalyst | Chromia-Alumina | Chromia-Silica-Alumina | Vanadia-Alumina | Tungsten Oxide-Alumina | Rhenium-Alumina | Manganese Oxide-Alumina |
| Metal Content, Wt. Percent | 4 | 16 | 4 | 4 | 5 | 4 |
| Feed | Normal Butane | Normal Butane | Normal Butane | Normal Butane | Isobutane | Normal Butane |
| Temperature, °F | 1,040 | 1,100 | 1,040 | 1,040 | 1,040 | 1,130 |
| Pressure, Atm | 1 | 1 | 1 | 1 | 1 | 1 |
| LHSV | 0.95 | 0.48 | 0.95 | 0.95 | 1.0 | 0.95 |
| Number of Catalyst Regenerations | 2 | 9 | Fresh Catalyst | Fresh Catalyst | Fresh Catalyst | 2 |
| Molecular Weight Distribution of Aromatics, Wt. Percent: | | | | | | |
| $C_6$ | 15.2 | 10.1 | 15.0 | 20.1 | 18.5 | 25.6 |
| $C_7$ | 21.6 | 24.1 | 27.9 | 42.1 | 25.0 | 27.3 |
| $C_8$ | 49.6 | 46.2 | 43.9 | 24.6 | 46.9 | 33.8 |
| $C_{9+}$ | 13.6 | 19.6 | 13.2 | 13.2 | 9.6 | 13.3 |

| | Run Number | | | | |
|---|---|---|---|---|---|
| | 11 | 12 | 13 | 14 | 15 |
| Catalyst | Chromia-Alumina | Chromia-Silica-Alumina | Vanadia-Alumina | Molybdenum-Alumina | Chromia-Fluorided Alumina |
| Metal Content, Wt. Percent | 4 | 16 | 4 | 26 | 21 |
| Feed | Normal Butane | Isobutane | Normal Butane | Isobutane | Normal Butane |
| Temperature, °F | 970 | 1,040 | 1,100 | 1,040 | 1,100 |
| Pressure, Atm | 1 | 1 | 1 | 1 | 1 |
| LHSV | 0.66 | 0.5 | 1.58 | 1.0 | 1.03 |
| Number of Catalyst Regenerations | 4 | 15 | 3 | Fresh Catalyst | 6 |
| Molecular Weight Distribution of Aromatics, Wt. Percent: | | | | | |
| $C_6$ | 9.9 | 8.0 | 20.6 | 11.5 | 19.4 |
| $C_7$ | 13.7 | 20.4 | 30.7 | 16.4 | 35.4 |
| $C_8$ | 63.3 | 47.6 | 35.7 | 49.7 | 30.5 |
| $C_{9+}$ | 13.1 | 24.0 | 13.0 | 22.4 | 14.7 |

In this process, pentane will react in a manner similar to butane, with only one difference—the larger pentane molecule in the feed will favor the production of the larger alkylated benzene compounds. Thus, a typical product analysis can be estimated for the reaction in which pentane, rather than butane, is contacted with a vanadia-alumina catalyst. This analysis is presented in Table IV.

TABLE IV

| Catalyst | Vanadia-alumina (4 wt. percent V). |
|---|---|
| Feed | Normal pentane. |
| Temperature | 1100° F. |
| Pressure | 1 atm. |
| LHSV | 0.48. |
| Per-pass conversion to aromatics, wt. percent | 37. |
| Ultimate yield of aromatics, wt. percent | 50. |
| Molecular, $C_6$ | 7.0. |
| Weight, $C_7$ | 23.5. |
| Distribution of, $C_8$ | 30.5. |
| Aromatics, wt. percent, $C_{9+}$ | 39.0. | process, the yield of alkylated benzene compounds is substantially lower; i.e., the selectivity for "dehydrocyclodimerization" is decreased. Operating pressures may be subatmospheric, atmospheric, or superatmospheric, and will fall in the range of from about 2 to 500 p.s.i.a. However, it is preferred to operate below 100 p.s.i.a., and more preferably, in the atmospheric or subatmospheric range for, as shown by Table V, conversions decline as the pressure is increased.

TABLE V

| Run Number | 16 | 17 | 18 | 19 | 20 |
|---|---|---|---|---|---|
| Pressure, Atm | 0.43 | 1 | 5 | 10 | 20 |
| Per-Pass Conversion To Aromatics, Wt. Percent | 29 | 24 | 9 | 6 | 2 |
| Ultimate Yield of Aromatics, Wt. Percent | 41 | 37 | 36 | 36 | 22 |
| Reaction Conditions: | | | | | |
| Catalyst | Chromia-Alumina (16 Wt. Percent Cr) | | | | |
| Feed | Normal Butane | | | | |
| Temperature | 1,040° F. (except 1,100° F. for Run No. 17) | | | | |

The paraffin feed may be introduced into the reaction zone at a liquid hourly space velocity of from 0.1 to 15, preferably from 0.3 to 2.0, as either a liquid or vapor, or in a mixed liquid-vapor phase. The reaction itself is carried on in the vapor phase.

The hydrocarbon feeds used in the laboratory study of this process were butanes of greater than 98% purity. In full-scale operation, the fresh feed stream is preferably comprised substantially entirely of paraffins having 4 and/or 5 carbon atoms, but may contain minor amounts of other materials which do not adversely effect the desired reaction. For example, the feed stream may contain some hydrogen, for it is recognized that the typical industrial feed stream (e.g., the butane cut from a refinery distillation column) will contain some hydrogen as an impurity due to incomplete fractionation. However, since the presence of added hydrogen in the fresh feed stream reduces the conversion (as illustrated by Table VI), it is preferred to operate in the complete absence of added hydrogen. Thus the amount of hydrogen in the feed stream is limited to a hydrogen to hydrocarbon ratio of less than 1.0 (considering only hydrogen other than that produced in the reaction), and preferably is less than 2 moles of hydrogen to 3 moles of hydrocarbon.

TABLE VI

| Run Number | 21 | 22 |
|---|---|---|
| Feed Hydrogen to Hydrocarbon Mol Ratio | (¹) | 1.27 |
| Per-Pass Conversion to Aromatics, Wt. Percent | 27 | 16 |
| Ultimate Yield of Aromatics, Wt. Percent | 38 | 27 |
| Reaction Conditions: | | |
| Catalyst | Vanadia-Alumina (4 Wt. Percent V) | |
| Hydrocarbon Feed | Normal Butane | |
| Temperature | 1,100° F. | |
| Pressure | 1 Atm. | |

¹ No hydrogen.

A minor amount (less than 1.5 weight percent) of hydrogen sulfide or compounds capable of forming hydrogen sulfide within the reactor (as by decomposition) can often be advantageously employed as a feed component so as to reduce catalyst fouling due to coke formation.

The catalysts used in the present process may be regenerated by burning off the coke with a mixture of oxygen and an inert gas, such as nitrogen or carbon dioxide. In these experiments, the regeneration was done with a mixture of 10% oxygen-90% nitrogen. As shown by Table III, such regeneration may be done a number of times. Several procedures for such regeneration have been described in the literature.

The present process can be conducted in either fixed catalyst bed, moving bed or fluid catalyst systems. In the fixed bed systems the catalyst may be arranged such that the acid and dehydrogenation components are in varying physical relationships with each other, as long as the feed is able to make full contact with both components while in the reactor. For instance, suitable physical arrangements include:

(1) "Homogeneous catalyst"—all catalyst particles contain essentially uniform amounts of both components.

(2) "Random mixture"—a given catalyst particle will contain only one of the two components, but the acid and dehydrogenation component containing particles will be randomly mixed throughout the entire catalyst bed.

(3) "Sandwich arrangement"—again a given particle will contain only one component, but here the monocomponent particles are arranged in layers, with only one type of particle in each layer. The only restriction on this arrangement is that the layers must not be so far separated that the intermediate reaction products from a monocomponent layer will decompose before reaching the next successive layer.

Because of the coke laydown on the catalyst and the desirability of regenerating the catalyst, it is preferred to employ contacting systems wherein regeneration can be accomplished without discontinuing the flow of feed to the reaction zone or zones. This can be done in several ways. One method involves the use of a swing reactor. Such a unit comprises a plurality of fixed bed reaction zones with line manifolding so as to allow the feed to be passed into a first zone and when the catalyst in that zone is deactivated by coke, to shift the feed to a second freshly regenerated reaction zone. After shifting the feed to the second reactor, the deactivated catalyst in the first zone is regenerated and ready for use when the second reactor is deactivated.

Another preferred contacting system is one involving a fluid catalyst system. In this operation, finely divided solid (fluid) catalysts are continuously recycled between a reaction zone and a separate regeneration zone. In each zone, the catalyst is maintained in a fluidized state that behaves much like a liquid. In the reactor, the feed is continuously contacted with freshly regenerated catalyst and the hydrocarbon products are removed from the reactor. The coked catalyst is continuously removed from the reactor and passed into the regenerator wherein it is contacted with an oxygen-containing gas to burn the coke and regenerate the catalyst. The regenerated catalyst is then returned to the reaction zone.

Whether employing a fixed, moving or fluid catalyst bed system, the hydrogen and hydrocarbons produced in the reaction zone are removed and recovered in any suitable manner, as by absorption and/or distillation. The actual separation of the various products can be done to suit the needs of the particular operator. Preferably, the $C_4$ to $C_5$ hydrocarbons recovered from the reaction zone are recycled thereto.

I claim:

1. A process for the production of alkylated benzene compounds, wherein a feed stream comprising at least one paraffinic hydrocarbon with 4 to 5 carbon atoms per molecule and the amount of added hydrogen being limited such that the added hydrogen to hydrocarbon ratio in the feed stream is less than 1.0, is contacted in a reactor with a solid catalyst comprising a dehydrogenation component selected from the group consisting of Groups V, VI and VII metals and their oxides and an acidic component, said acidic component being of sufficient acidity that the acidity index of the catalyst is between 0.10 and 0.79, at a temperature in the range of from about 800° to 1200° F. and a pressure in the range of from about 2 to 500 p.s.i.a., and the alkylated benzene compounds are withdrawn as the principal aromatic reaction product.

2. The process of claim 1, wherein the dehydrogenation component of the catalyst is a metal oxide disposed on alumina.

3. The process of claim 1, wherein the principal aromatic reaction product is toluene.

4. The process of claim 1, wherein the principal aromatic reaction product is an alkylated benzene compound containing eight carbon atoms per molecule.

5. The process of claim 1, wherein the temperature is in the range of from about 950° to 1170° F.

6. The process of claim 1, wherein the pressure is in the range of from about 5 to 100 p.s.i.a.

7. The process of claim 1, wherein the acidity index of the catalyst is between 0.40 and 0.79.

8. A process for the production of alkylated benzene compounds, wherein a feed stream comprising at least one paraffinic hydrocarbon with 4 to 5 carbon atoms per molecule and the amount of added hydrogen being limited such that the added hydrogen to hydrocarbon ratio in the feed stream is less than 1.0, is continuously contacted in a reaction zone with a fluidized catalyst comprising a dehydrogenation component selected from the group consisting of Groups V, VI, and VII metals and their oxides and an acidic component, said acidic component being of sufficient acidity such that the acidity index of the catalyst is between 0.40 and 0.79, at a temperature in the range of from about 800° to 1200° F. and a pressure in the range of from about 2 to 500 p.s.i.a., continuously recovering hydrogen and alkylated benzene compounds as the principal reaction products from said reaction zone, continuously withdrawing coke-containing catalyst from said reaction zone and regenerating said coke-containing catalyst in a regeneration zone by contact with an oxygen-containing gas at elevated temperature, and continuously returning regenerated catalyst from said regeneration zone to said reaction zone.

References Cited

UNITED STATES PATENTS

| | | | |
|---|---|---|---|
| 2,739,996 | 3/1956 | Pitzer | 260—673 X |
| 2,992,283 | 7/1961 | Eng. | |
| 3,000,809 | 9/1961 | Ridgeway et al. | |
| 3,046,317 | 7/1962 | Myers. | |
| 3,126,426 | 3/1964 | Turnquest et al. | |
| 3,247,276 | 4/1966 | Child et al. | 260—673 |

FOREIGN PATENTS

| | | |
|---|---|---|
| 1,054,623 | 4/1959 | Germany. |
| 1,074,564 | 4/1960 | Germany. |

DELBERT E. GANTZ, *Primary Examiner.*

C. R. DAVIS, *Assistant Examiner.*